Patented Sept. 22, 1936

2,055,222

UNITED STATES PATENT OFFICE 2,055,222

MANUFACTURE OF TITANIUM PIGMENTS

Willis F. Washburn, Metuchen Township, Middlesex County, N. J., and Franklin L. Kingsbury, St. Louis, Mo., assignors to Titanium Pigment Company, Inc., New York, N. Y., a corporation of Maine No Drawing. Application February 2, 1935, Serial No. 4,721

17 Claims. (Cl. 134—58)

This application is a continuation in part of our co-pending application, Serial No. 475,385, filed August 14, 1930, which discloses a method for the manufacture of titanium pigments.

In U. S. Patent No. 1,906,729 of May 2, 1933, by one of us as a co-inventor, a process is described for the manufacture of titanium oxide and composite pigments containing titanium oxide and an extender, such as barium sulfate, silica, etc., and particularly composite pigments containing higher percentages of titanium oxide than those ordinarily found on the market.

The process as set forth in the above mentioned patent is one which involves having present during the hydrolytic precipitation of titanium-oxygen compounds from mineral acid solutions containing titanium adsorptive nuclear substances, such as, for example, the extender calcium sulfate, which may be caused to exist in the solutions in the form of finely divided particles which are largely insoluble in the solution but which do, nevertheless, exhibit some slight solubility.

A preferred form of calcium sulfate is that prepared by the addition of a water slurry of slaked lime to sulfuric acid. Such a method may consist in adding a compound of calcium, e. g. hydrated lime or calcium carbonate to concentrated or relatively concentrated sulfuric acid. Concentrations may be adjusted and temperatures controlled so as to produce by this method an extremely finely divided material having a crystalline structure which, under microscopic and X-ray examinations, is found to be largely that of the anhydrite. Although most satisfactory results have been obtained when using this preferred form of calcium sulfate, other forms, either artificially prepared, or as found in nature, may be used to some advantage.

The presence of calcium sulfate not only accelerates the hydrolytic precipitation of titanium, but also causes the precipitate to take a form and to possess certain physical characteristics which combine to produce, after washing and calcination, a pigment having excellent color, opacity, and other desirable pigmentary qualities.

If an insoluble extender is present during the hydrolytic precipitation of titanium, the precipitate and the resulting pigment will be of the composite type. When calcium sulfate is the only extender present during hydrolysis, the precipitate will be of the composite type, but if the calcium sulfate is completely removed by washing, the resulting pigment will be of the pure titanium oxide type.

We have now discovered new and improved methods whereby the hydrolytic precipitation of titanium compounds may be further accelerated and even superior titanium pigments can be obtained.

Our improved methods comprise having present during the hydrolytic precipitation of titanium compounds, not only calcium sulfate, but also certain titanium compounds in crystalloid condition which are formed by precipitation upon the addition of alkaline neutralizing agents, such as, for example, sodium carbonate, potassium hydroxide, ammonium hydroxide, calcium carbonate, barium hydroxide, etc., to acid titanium solutions and redissolution therein.

Upon adding any of these alkaline neutralizing agents to an acid solution of titanium a precipitate is formed which is apparently a form of hydrated titanium oxide varying in composition and physical properties, depending upon the method of mixing, solution concentrations, temperature, etc., but which, regardless of variation in composition and physical properties, can be redissolved in crystalloid condition in the solution from which it had been precipitated or in one of similar composition. Such titanium solutions so prepared apparently possess a nuclear effect upon the subsequent thermal hydrolysis and complement and/or supplement the action of the finely divided adsorptive calcium sulfate nuclei which, according to the present invention, are also present during the ultimate hydrolysis. The precipitates, after washing and calcining, are titanium pigments of exceptional quality.

By the term "alkaline neutralizing agent" as used by us in this description of our invention and in the appended claims we mean to include those substances which are capable of lowering the hydrogen ion concentration of acid solutions, particularly sulfuric acid solutions. Such neutralizing agents may consist of alkaline compounds of the ammonium radical, NH$_4$—, e. g. ammonium hydroxide; the alkali metals, e. g. sodium carbonate; the alkali-earth metals, e. g. calcium oxide. The compounds comprising such a group possess in common the properties of neutralizing mineral acids, forming salts of the acidic radical and replacing the hydrogen of the acid molecule; they furnish no acid radical which will remain in solution and all give aqueous solutions or suspensions having a hydrogen ion concentration, expressed as pH value, numerically higher than 7.0. It will be understood that the improved results of our invention do not depend upon the particular neutralizing agent employed but rather upon its ability to combine with the sulfate radical, thus producing a local precipitation of titanium compounds.

We have conducted many experiments in an attempt to secure our desired effect by adding, alone, various proportions of alkali-precipitated titanium compounds to acid titanium solutions, but we have not attained results, as will later be shown, which approach those obtained when crystalloid solutions of redissolved alkali-precipitated titanium compounds are used in conjunction with calcium sulfate.

It should be pointed out that in the previous and subsequent portions of this description of our invention, the term "acid titanium solution" is used to mean mineral acid solutions, e. g. sulfuric acid solutions, containing titanium in which there is present an amount of acid in excess of that which would theoretically be required to combine with all the base-forming elements present in the solution to form normal sulfates; in other words, a mineral acid solution containing titanium and other base-forming elements and free acid.

We are aware that it has been suggested, as a means of accelerating the hydrolysis of mineral acid solutions containing titanium, to add colloidal titanium oxide to the solution to be hydrolyzed. This colloidal titanium oxide is often spoken of as being "nuclei" for the further precipitation of titanium compounds. However, such processes when employed in conjunction with acid titanium solutions of the type employed by us, either alone or in conjunction with calcium sulfate, do not yield results comparable to those obtained from the present invention. It has been suggested that the addition of colloidal titanium oxide is effective when employed in the hydrolysis of titanium solutions containing about 400 grams per liter of $H_2SO_4$ and 160 grams $TiO_2$. Since, according to the equation:

$$TiO_2 + 2H_2SO_4 = Ti(SO_4)_2$$

160 grams $TiO_2$ will require 392 grams $H_2SO_4$ to form the normal sulfate, such solution contains only 8 grams per liter $H_2SO_4$ (or about 0.1%) over that required for the titanium and, since such solution always contains appreciable quantities of iron, even though the major portion may have been removed from the solution, as by crystallization as ferrous sulfate, there is presumably present an excess of base-forming elements. Hence, such solutions must be considered as basic or neutral but not as acid solutions in the sense employed by us.

Our present invention is further distinguished from such processes in that the solution which we employ in conjunction with finely divided calcium sulfate is substantially free from colloidal titanium oxide. A typical solution prepared according to the methods of our invention when tested in a Tyndallimeter (cf. A. B. Cummins and M. S. Badollet; Ind. Eng. Chem., Anal. Ed. 5, 328, (1933)) had a Tyndall cone the intensity of which, as measured by a MacMichael photometer, was 1.24 foot-candles. After redissolution of the alkali precipitated titanium compounds in accordance with our invention the Tyndall cone gave an intensity reading, using the same light source, of 1.32; a result well within the limits of experiment error. On the other hand, the same solution containing colloidal titanium oxide, prepared according to the prior art processes above noted, gave a reading of 256 foot-candles. This test, which in effect is a measure of the light diffused by the colloid particles, shows clearly the absence of such particles from the solutions of the present invention.

Many alternative procedures in the above described general method of practicing our invention may be employed: (1) A concentrated aqueous solution or suspension of the alkaline neutralizing agent may be poured upon the surface of the solution containing titanium and the resulting precipitate of titanium compounds redissolved therein, as by agitation; (2) the solution containing titanium may be added to an aqueous solution or suspension of the alkaline neutralizing agent which is being agitated so that the precipitated titanium compounds formed are redissolved; (3) a part of the solution containing titanium may be mixed with an aqueous solution or suspension of the alkaline neutralizing agent and (3a) redissolved therein by agitation or (3b) added to the remaining portion of the titanium solution and then redissolved. In the above three methods the finely divided calcium sulfate is added subsequent to the preparation of the crystalloid solution of precipitated titanium compounds. Any of these three methods may be applied to titanium solutions to which the calcium sulfate has already been added.

It will be understood, of course, that in the foregoing by the use of the expression "solution containing titanium" etc., we mean solutions containing free sulfuric acid in excess of that required to form normal salts with all the base-forming elements present in the solution.

The quantities of alkaline neutralizing agents employed and the temperatures at which they may be added can be varied considerably. In general, we have secured our improved results when employing an alkaline neutralizing agent in quantities sufficient to produce an initial precipitation of from 2.0% to 12.0%, preferably about 7.0%, of the titanium, calculated as Ti, based upon the amount originally present in the solution to be hydrolyzed, or, upon the total titanium content, if two titanium acid solutions are to be mixed prior to hydrolysis. By redissolution of the precipitated titanium compounds the titanium content in crystalloid solution is maintained substantially unaltered. It will be understood, of course, that for certain reasons as, for example, inadequate stirring, some small amount of undissolved alkali-precipitated titanium compounds may be present at the start of the thermal hydrolysis. These, however, are without consequence and we regard them, if not actually detrimental to the process of our invention, as possessing no beneficial effect.

When an alkaline neutralizing agent is added to a solution of a titanium salt, the acid radical of which forms a compound with the metallic element of the alkaline neutralizing agent which is not completely soluble, a precipitate of this compound is formed together with a precipitate of titanium compounds. Such compounds are for the most part compounds of the alkali-earth metals. These compounds, derived from the alkaline neutralizing agent, do not interfere with the effectiveness of the solutions obtained by redissolution of alkali-precipitated titanium compounds to accelerate the subsequent thermal hydrolysis of titanium-oxygen compounds which, after washing and calcining, possess superior pigment properties. Furthermore, if the compound derived from the alkaline neutralizing agent is calcium sulfate, it may be removed from the ultimate precipitate of titanium compounds by washing, if so desired.

While our improved methods may be used to advantage in the manufacture of composite titanium pigments containing extenders other than calcium sulfate, such as precipitated blanc fixe, particularly in the manufacture of such composite pigments containing higher percentages of titanium oxide, say 35% or more, they are also especially advantageous in the manufacture of composite titanium oxide pigments containing such extenders as milled natural barytes, milled natural silica, etc., which are not satisfactory in ordinary methods of manufacture.

When manufacturing composite titanium oxide pigments other than those containing calcium sulfate, the extender material of the composite is suspended in the solution containing titanium, either before or after, preferably after, the redissolution of the alkali-precipitated titanium compounds.

The mineral acid solution containing the redissolved alkali-precipitated titanium compounds, the finely divided calcium sulfate, and, as the case may be, other extenders, is then heated and maintained at or near the boiling point until about 95% of the titanium has been precipitated. The composite precipitate is then filtered or, in other ways, separated from the mother liquor. If calcium sulfate be the only extender present, it may be partially or completely removed by washing, using as washing medium an acid or salt solution, e. g. hydrochloric acid or ammonium chloride, in which the calcium sulfate is more soluble than in water. The precipitate is finally calcined at a temperature ranging between 700° and 1200° C.

In order more fully to illustrate the present invention the following examples are given. It is to be understood, however, that our invention is in no way limited to the conditions, proportions, etc., of these examples.

Ilmenite ore was first brought into solution with sulfuric acid. All of the iron and a small part of the titanium were reduced to lower valences by well-known methods and the insoluble residue allowed to settle. The clear solution, which was then used in carrying out the examples, analyzed as follows:

| | Per cent |
|---|---|
| Titanium oxide ($TiO_2$) | 6.07 |
| Ferrous oxide (FeO) | 5.88 |
| Uncombined sulfuric acid | 6.43 |

When operating with such solutions a part of the iron may be removed as by crystallization as ferrous sulfate. In the following examples the iron was not removed:

*Example 1—Pure titanium oxide.*—A solution of 19 lbs. of sodium carbonate in 57 lbs. of water at 80° C. was poured upon the surface of 1647 lbs. of the above described solution of ilmenite ore. The precipitated titanium compounds were immediately stirred into solution, after which the solution was added to a slurry of calcium sulfate which had been prepared by adding 25 lbs. of hydrated lime in 32 gallons of water at 20° C. to 204.5 lbs. of 78% sulfuric acid at a temperature of 20° C. The precipitation charge so obtained was agitated, heated to a boil, and boiled until about 90%–95% of the titanium was precipitated. The composite precipitate was then separated, washed until substantially free from calcium sulfate, dried and calcined at 850° C.

The specific gravity of the final product was 3.9. By analysis, it was found to contain:

| | |
|---|---|
| Titanium oxide | 99.1% |
| Calcium sulfate | Traces |
| Other substances | Traces |

*Example 2—75% titanium oxide, 25% calcium sulfate.*—A solution of 19 lbs. of sodium carbonate in 57 lbs. of water at 80° C. was added to a solution of 1647 lbs. of the above described solution of ilmenite ore. The resulting solution containing precipitated titanium compounds was then added to a slurry of calcium sulfate prepared in the manner described in Example 1. The precipitation charge so obtained was agitated, to bring about a dissolution of the precipitated titanium compounds, heated to a boil, while still agitating the solution, and boiled until about 90%–95% of the titanium was precipitated. The composite precipitate was then separated, washed until substantially free from iron, and calcined at 850° C.

The specific gravity of the final product was 3.6. By analysis, it was found to contain:

| | |
|---|---|
| Titanium oxide | 74.7% |
| Calcium sulfate | 25.2% |
| Other substances | Traces |

*Example 3—25% titanium oxide, 75% barium sulfate.*—A solution of 19 lbs. of sodium carbonate in 57 lbs. of water at 80° C. was added to 1647 lbs. of the above described solution of ilmenite ore and the precipitated titanium compounds redissolved by stirring, after which the mixture was combined with a barytes-gypsum slurry which had been prepared by adding 25 lbs. of lime in 32 gallons of water at 20° C. to 122 lbs. of 78% sulfuric acid at a temperature of 20° C., and mixing with a suspension of 285 lbs. of milled natural barytes in 190 lbs. of water. The precipitation charge so obtained was agitated, heated to a boil, and boiled until about 90%–95% of the titanium was precipitated. The composite precipitate was then separated, washed until substantially free from calcium sulfate, dried and calcined at 850° C.

The specific gravity of the final product was 4.3. By analysis, it was found to contain:

| | |
|---|---|
| Titanium oxide | 25.1% |
| Barium sulfate | 74.8% |
| Calcium sulfate | Traces |
| Other substances | Traces |

In the practice of the process as illustrated by the above examples, the order in which the components of the precipitation charge are added to the precipitation tank, temperatures, concentrations, and proportions may be varied considerably without substantially affecting the desired result.

The final products are characterized by their fine pigment qualities. They are clear white in color, possess high hiding power, tinting strength and opacity and are free from coarse or gritty particles. They may be used to advantage in paints, lacquers and the like and in other arts where such pigments find use.

In order that the superiority of products prepared according to methods of the present invention will be appreciated, the following table is given:

| Procedure | Yield: 8 hours heating | Pigment | |
|---|---|---|---|
| | | Color * | Tinting strength ** |
| A | Percent 87 | +00 | 1,350 |
| B | 87 | +0 | 1,070 |
| C | 90 | 1 | 700 |
| D | 91 | −2 | 670 |
| E | 37 | Yellow | 600 |

* Color rating system: 00, 0, 1, 2 in decreasing order of brightness; "minus" denotes somewhat poorer than, "plus" somewhat better than.

** The tinting strength: Determinations were obtained in accordance with the tentative method of the American Society for Testing Materials, A. S. T. M. Designation D. 332—31T. Proc. A. S. T. M. 31, page 797 (1931).

The procedure marked A, B, C, etc. were as follows:

A. Procedure of the present invention.

B. Procedure of U. S. Patent No. 1,906,729 (finely divided CaSO$_4$ alone).

C. Procedure of the present invention, using alkali-precipitated titanium compounds but no finely divided CaSO$_4$.

D. Prior art procedure using colloidal titanium oxide.

E. Thermal hydrolysis of titanium solution alone, without the aid of either CaSO$_4$ or alkali-precipitated titanium compounds.

It will be noted that, although in C and D the yield values were higher, the products were greatly inferior in color and tinting strength.

We claim:

1. A process for the preparation of titanium pigments which comprises adding an alkaline neutralizing agent to a sulfuric acid solution of titanium containing free sulfuric acid, redissolving the precipitated titanium compounds to crystalloid condition in said solution by agitation, thoroughly mixing the resulting solution with finely divided calcium sulfate, heating the mixture to cause hydrolysis and precipitation of titanium-oxygen compounds, washing the precipitate and then calcining it.

2. A process for the preparation of titanium pigments which comprises adding to a sulfuric acid solution of titanium containing free sulfuric acid, a neutralizing agent selected from the group consisting of the oxides, hydroxides and carbonates of the ammonium radical, NH$_4$—, of the alkali metals, of the alkali-earth metals, agitating the solution in order to redissolve the precipitated titanium compounds to crystalloid condition, thoroughly mixing the resulting solution with an aqueous slurry of artificially prepared calcium sulfate having the crystalline structure of anhydrite, heating the mixture while agitating it until hydrolytic precipitation of the titanium is substantially complete, washing the composite precipitate of titanium-oxygen compounds and calcium sulfate and calcining it at a temperature between 700° and 1200° C.

3. A process for the preparation of titanium oxide, which comprises adding to a sulfuric acid solution of titanium containing free sulfuric acid, a neutralizing agent selected from the group consisting of the oxides, hydroxides and carbonates of the ammonium radical, NH$_4$—, of the alkali metals, of the alkali-earth metals, agitating the solution in order to redissolve the precipitated titanium compounds to crystalloid condition, thoroughly mixing the resulting solution with an aqueous slurry of artificially prepared calcium sulfate having the crystalline structure of anhydrite, heating the mixture while agitating it until hydrolytic precipitation of the titanium is substantially complete, washing the composite precipitate until it is substantially free of calcium sulfate and calcining the titanium-oxygen compounds at a temperature between 700° and 1200° C.

4. A process for the preparation of titanium pigments, which comprises adding to a sulfuric acid solution of titanium containing free sulfuric acid, a neutralizing agent selected from the group consisting of the oxides, hydroxides and carbonates of the ammonium radical, NH$_4$—, of the alkali metals, of the alkali-earth metals, agitating the solution in order to redissolve the precipitated titanium compounds to crystalloid condition, thoroughly mixing the resulting solution with an aqueous slurry of artificially prepared calcium sulfate having the crystalline structure of anhydrite and another extender, heating the mixture while agitating it until hydrolytic precipitation of the titanium is substantially complete, washing the composite precipitate until it is substantially free of calcium sulfate and calcining the titanium-oxygen compounds and extender at a temperature between 700° and 1200° C.

5. A process for the preparation of titanium pigments, which comprises adding to a sulfuric acid solution of titanium containing free sulfuric acid, a neutralizing agent selected from the group consisting of the oxides, hydroxides and carbonates of the ammonium radical, NH$_4$—, of the alkali metals, of the alkali-earth metals, in amount sufficient to precipitate from 2%–12% of the titanium present in the solution, agitating the solution in order to redissolve the precipitated titanium compounds to crystalloid condition, thoroughly mixing the resulting solution with an aqueous slurry of artificially prepared calcium sulfate having the crystalline structure of anhydrite in amount greater than 1 part of CaSO$_4$, by weight, for every 10 parts TiO$_2$, by weight, in the solution, heating the mixture while agitating it until hydrolytic precipitation of titanium is substantially complete, washing the composite precipitate of titanium-oxygen compounds and calcium sulfate and calcining it at a temperature of between 700° and 1200° C.

6. A process for the preparation of titanium oxide, which comprises adding to a sulfuric acid solution of titanium containing free sulfuric acid, a neutralizing agent selected from the group consisting of the oxides, hydroxides and carbonates of the ammonium radical, NH$_4$—, of the alkali metals, of the alkali-earth metals, in amount sufficient to precipitate from 2%–12% of the titanium present in the solution, agitating the solution in order to redissolve the precipitated titanium compounds to crystalloid condition, thoroughly mixing the resulting solution with an aqueous slurry of artificially prepared calcium sulfate having the crystalline structure of anhydrite in amount greater than 1 part of CaSO$_4$, by weight, for every 10 parts of TiO$_2$, by weight, in the solution, heating the mixture while agitating it until hydrolytic precipitation of titanium is substantially complete, washing the composite precipitate until it is substantially free of calcium sulfate and calcining the titanium-oxygen compounds at a temperature between 700° and 1200° C.

7. A process for the preparation of titanium pigments, which comprises adding to a sulfuric acid solution of titanium containing free sulfuric acid, a neutralizing agent selected from the group consisting of the oxides, hydroxides and carbonates of the ammonium radical, NH$_4$—, of the alkali metals, of the alkali-earth metals, in amount sufficient to precipitate from 2%–12% of the titanium present in the solution, agitating the solution in order to redissolve the precipitated titanium compounds to crystalloid condition, thoroughly mixing the resulting solution with an aqueous slurry of artificially prepared calcium sulfate and another extender, the calcium sulfate having the crystalline structure of anhydrite and being used in amount greater than 1 part CaSO$_4$, by weight, for every 10 parts TiO$_2$, by weight, in the solution, heating the mixture while agitating it until hydrolytic precipitation of titanium is substantially complete, washing the composite precipitate until it is substantially free of calcium sulfate, and calcining the titanium-oxygen compounds and extender at a temperature between 700° and 1200° C.

8. Process as described in claim 5, in which the alkaline neutralizing agent employed is sodium carbonate.

9. Process as described in claim 6, in which the alkaline neutralizing agent employed is sodium carbonate.

10. Process as described in claim 7, in which the alkaline neutralizing agent employed is sodium carbonate.

11. Method for the preparation of titanium-containing precipitates adapted for the manufacture of titanium pigments, which consists in heating a sulfuric acid solution of titanium containing free sulfuric acid in which is present: (1) redissolved alkali-precipitated titanium compounds in crystalloid solution, and, (2) finely divided calcium sulfate having the crystalline structure of anhydrite, in suspension, until hydrolytic precipitation of the titanium-oxygen compounds is substantially complete.

12. Method for the preparation of titanium-containing precipitates adapted for the manufacture of titanium pigments, which consists in heating a sulfuric acid solution of titanium containing free sulfuric acid in which is present: (1) redissolved alkali-precipitated titanium compounds in crystalloid solution; (2) finely divided calcium sulfate having the crystalline structure of anhydrite in suspension, and; (3) another extender also in finely divided suspension, until hydrolytic precipitation of the titanium-oxygen compounds is substantially complete.

13. In a process for the preparation of titanium pigments, the steps which comprise adding to a sulfuric acid solution of titanium containing free sulfuric acid, a neutralizing agent selected from the group: oxides, hydroxides and carbonates of the ammonium radical, $NH_4$—, of the alkali metals and of the alkali-earth metals, in an amount sufficient to cause precipitation of from 2%–12% of the titanium in the solution, redissolving the precipitated titanium compounds in said solution to crystalloid condition, incorporating therewith finely divided calcium sulfate having the crystalline structure of anhydrite, and heating the mixture until hydrolytic precipitation of the titanium is substantially complete.

14. In a process for the preparation of titanium pigments, the steps which consist in adding to a sulfuric acid solution of titanium-containing free sulfuric acid another titanium solution containing free sulfuric acid and from 2%–12% of incompletely-dissolved alkali-precipitated titanium compounds, based on the titanium content of the combined solutions calculated as Ti, completing the dissolution of said precipitated titanium compounds to crystalloid condition in the combined solutions, incorporating therewith finely divided calcium sulfate having the crystalline structure of anhydrite, and heating until hydrolytic precipitation of the titanium is substantially complete.

15. Process as described in claim 4, in which the extender is milled natural barytes.

16. Process as described in claim 7, in which the extender is milled natural barytes.

17. Process as described in claim 12, in which the extender is milled natural barytes.

WILLIS F. WASHBURN.
FRANKLIN L. KINGSBURY.